United States Patent
Qin et al.

(10) Patent No.: US 12,461,594 B2
(45) Date of Patent: Nov. 4, 2025

(54) VISUAL AXIS ENROLLMENT

(71) Applicant: Apple Inc., Cupertino, CA (US)

(72) Inventors: Hao Qin, Saratoga, CA (US); Hua Gao, San Jose, CA (US); Tom Sengelaub, Oakland, CA (US)

(73) Assignee: Apple Inc., Cupertino, CA (US)

( * ) Notice: Subject to any disclaimer, the term of this patent is extended or adjusted under 35 U.S.C. 154(b) by 27 days.

(21) Appl. No.: 18/534,398

(22) Filed: Dec. 8, 2023

(65) Prior Publication Data

US 2024/0211039 A1 Jun. 27, 2024

Related U.S. Application Data

(60) Provisional application No. 63/476,924, filed on Dec. 22, 2022.

(51) Int. Cl.
*G06F 3/01* (2006.01)
*G06F 1/16* (2006.01)
*G06T 7/73* (2017.01)

(52) U.S. Cl.
CPC .............. *G06F 3/013* (2013.01); *G06F 1/163* (2013.01); *G06T 7/75* (2017.01); *G06T 2207/30196* (2013.01)

(58) Field of Classification Search
CPC .......... G06F 3/011; G06F 3/013; G06F 1/163; G06T 7/60; G06T 7/75; G06T 2207/30041; G06V 40/18; G06V 40/193
See application file for complete search history.

(56) References Cited

U.S. PATENT DOCUMENTS

| | | |
|---|---|---|
| 10,554,950 B1 | 2/2020 | Curlander |
| 2013/0021373 A1 | 1/2013 | Vaught |
| 2013/0050642 A1 | 2/2013 | Lewis et al. |
| 2013/0156265 A1* | 6/2013 | Hennessy .............. G06V 40/18 382/103 |
| 2014/0055591 A1* | 2/2014 | Katz ....................... G06F 21/32 348/78 |
| 2015/0288944 A1 | 10/2015 | Nistico |
| 2016/0018646 A1 | 1/2016 | Osterhout |
| 2016/0134863 A1 | 5/2016 | Horesh |
| 2017/0263007 A1* | 9/2017 | Cavin .................... G06V 40/18 |

(Continued)

FOREIGN PATENT DOCUMENTS

| | | |
|---|---|---|
| WO | 2016073131 | 5/2016 |
| WO | 2022261205 | 12/2022 |

OTHER PUBLICATIONS

International Search Report and the Written Opinion from PCT/US2023/085526, dated Mar. 26, 2024, pp. 1-13.

*Primary Examiner* — Priyank J Shah
(74) *Attorney, Agent, or Firm* — Robert C. Kowert; Kowert, Hood, Munyon, Rankin & Goetzel, P.C.

(57) ABSTRACT

In an unobtrusive visual axis enrollment process, a line of text or other content is displayed at a known vertical location and virtual depth that the user can then read. This line of text may be content that the user needs to read as part of the normal enrollment process. As the user reads the line of text, eye tracking cameras may capture images of the eye. This data may then be used to estimate a stimulus plane. The error between the estimated stimulus plane and the ground truth stimulus plane (the actual location of the line of text in virtual space) may then be used to estimate the kappa angle.

21 Claims, 8 Drawing Sheets

(56) References Cited

U.S. PATENT DOCUMENTS

| | | |
|---|---|---|
| 2018/0032812 A1 | 2/2018 | Sengelaub et al. |
| 2018/0246336 A1 | 8/2018 | Greenberg |
| 2019/0042842 A1 | 2/2019 | Cavin |
| 2019/0392145 A1 | 12/2019 | Komogortsev |
| 2020/0033560 A1 | 1/2020 | Weber et al. |
| 2020/0257359 A1 | 8/2020 | Klingstrom |
| 2021/0011549 A1 | 1/2021 | Ryan et al. |
| 2021/0173206 A1 | 6/2021 | Das |
| 2022/0270645 A1 | 8/2022 | Song |
| 2023/0038781 A1 | 2/2023 | Ryu |
| 2024/0103618 A1 | 3/2024 | Benndorf et al. |
| 2024/0211038 A1 | 6/2024 | Qin et al. |

\* cited by examiner

VISUAL AXIS ENROLLMENT

PRIORITY APPLICATION

This application claims benefit of priority to U.S. Provisional Application Ser. No. 63/476,924, entitled "Visual Axis Enrollment," filed Dec. 22, 2022, and which is hereby incorporated herein by reference in its entirety.

BACKGROUND

Extended reality (XR) systems such as mixed reality (MR) or augmented reality (AR) systems combine computer generated information (referred to as virtual content) with real world images or a real-world view to augment, or add content to, a user's view of the world. XR systems may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for visual axis enrollment on a device, for example head-mounted devices (HMDs) including but not limited to HMDs used in extended reality (XR) applications and systems, are described. HMDs may include wearable devices such as headsets, helmets, goggles, or glasses. An XR system may include an HMD which may include one or more cameras that may be used to capture still images or video frames of the user's environment. The HMD may include lenses positioned in front of the eyes through which the wearer can view the environment. In XR systems, virtual content may be displayed on or projected onto these lenses to make the virtual content visible to the wearer while still being able to view the real environment through the lenses.

In at least some systems, the HMD may include gaze tracking technology. Note that the gaze tracking may be performed for one or for both eyes. In such systems, during an initial calibration or enrollment process, a multidimensional personalized model of the user's eye(s) may be generated from one or more images of the eye(s) captured by eye tracking camera(s). This can be done unobtrusively, without prompting, as the user moves their eyes. The personalized eye model(s) generated from the images captured as the eyes move may include information such as a cornea surface model, iris and pupil model, eye center, entrance pupil, and a pupillary or optical axis (a vector which passes through the geometric eye center and the entrance pupil).

However, an eye's actual gaze direction corresponds to a visual axis, which is offset from the calculated optical axis of the eye model. Thus, another part of the calibration or enrollment process is to estimate the visual axis, or kappa angle between the optical axis and the visual axis.

To estimate the kappa angle/visual axis, it is necessary to have at least one ground truth point at which the user looks, with additional image(s) captured by the eye tracking cameras used to estimate the kappa angle and thus visual axis. Conventionally, a point is displayed on the interface, and the user is prompted to look at that point. However, this conventional method is intrusive; the user has to be prompted to do something (look at the displayed point) to fully enroll the eye(s).

Embodiments of methods and apparatus to inconspicuously and unobtrusively estimate and enroll the visual axis for the eye(s) are described. In embodiments, rather than displaying a point and prompting the user to look at the point, a line of text (or other content) is displayed at a known vertical location and virtual depth that the user can then read. This line of text may be content that the user needs to read as part of the enrollment process, such as "Please read and agree to the following terms of use." The line of text may be the only content displayed (or displayed at the known virtual depth) at the time. In other words, in some embodiments, only a single horizontal line of content such as text needs to be displayed. As the user reads the line of text, the eye tracking cameras may capture images of the eye. This data may then be processed to estimate a stimulus plane. The error between the estimated stimulus plane and the ground truth stimulus plane (the actual location of the line of text in virtual space) may then be determined and used to estimate the kappa angle, and thus the true visual axis of the eye.

This method of estimating the visual axis avoids an extra step in the eye enrollment process, and is thus more efficient and less intrusive than previous methods. The user reads a line of text, and the eye model and visual axis are enrolled. No explicit eye enrollment process with prompts to the user is necessary.

The personalized eye model and the estimated kappa angle/visual axis may then be used in various algorithms, for example in the gaze estimation process for a gaze-based interface, during use of the device.

Figure 1:
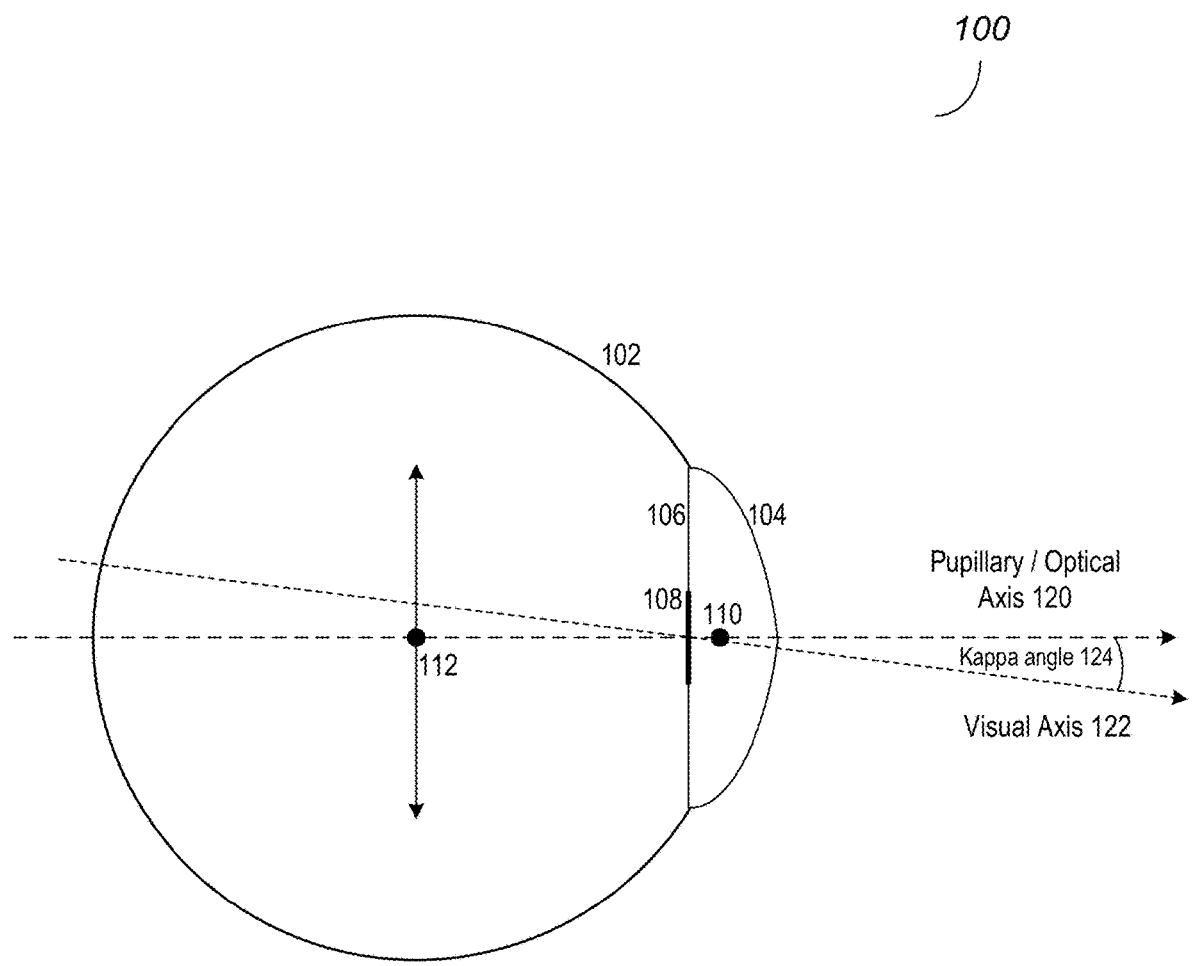
FIG. 1 graphically illustrates an N-dimensional model of an eye, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/ circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for visual axis enrollment on a device, for example head-mounted devices (HMDs) including but not limited to HMDs used in extended reality (XR) applications and systems, are described. HMDs may include wearable devices such as headsets, helmets, goggles, or glasses. An XR system may include an HMD which may include one or more cameras that may be used to capture still images or video frames of the user's environment. The HMD may include lenses positioned in front of the eyes through which the wearer can view the environment. In XR systems, virtual content may be displayed on or projected onto these lenses to make the virtual content visible to the wearer while still being able to view the real environment through the lenses.

In at least some systems, the HMD may include gaze tracking technology. In an example gaze tracking system, one or more infrared (IR) light sources emit IR light towards a user's eye. A portion of the IR light is reflected off the eye and captured by an eye tracking camera. Images captured by the eye tracking camera may be input to a glint and pupil detection process, for example implemented by one or more processors of a controller of the HMD. Results of the process are passed to a gaze estimation process, for example implemented by one or more processors of the controller, to estimate the user's current point of gaze. This method of gaze tracking may be referred to as PCCR (Pupil Center Corneal Reflection) tracking. Note that the gaze tracking may be performed for one or for both eyes.

In such systems, during an initial calibration or enrollment process, a multidimensional personalized model of the user's eye(s) may be generated from one or more images of the eye(s) captured by the eye tracking camera as described above. FIG. 1 graphically illustrates an N-dimensional model 100 of an eye, according to some embodiments. Physical components of an eye may include a sclera 102, cornea 104, iris 106, and pupil 108. In some embodiments, during an initial calibration or enrollment process, an N-dimensional model of the user's eye 100 may be generated from one or more images of the eye 100. In an example method, one or more infrared (IR) light sources emit IR light towards a user's eye. A portion of the IR light is reflected off the eye and captured by an eye tracking camera. Two or more images captured by the eye tracking camera may be input to an eye model generating process, for example implemented by one or more processors of a controller of the HMD. The process may determine the shapes and relationships of the eye's components based at least in part on positions of the glints (reflections of the point light sources) in the two or more captured images. This information may then be used to generate the personalized eye model. The personalized eye model may include information such as a cornea surface model, iris and pupil model, eye center 112, entrance pupil 110, and pupillary or optical axis 120 (a vector which passes through the eye center 112 and the entrance pupil 110). This personalized eye model may then be used in various algorithms, for example in the gaze estimation process, during use of the device.

However, an eye's actual gaze direction corresponds to a visual axis 122, which is offset from the calculated optical axis 120 of the eye model. Thus, another part of the calibration or enrollment process is to estimate the visual axis 122, or kappa angle 124 between the optical axis 120 and the visual axis 122.

To estimate the kappa angle 124/visual axis 122, it may be necessary to have at least one ground truth point at which the user looks, with additional image(s) captured by the eye tracking cameras used to estimate the kappa angle 124 and thus the visual axis 122. Conventionally, a point is displayed on the interface, and the user is prompted to look at that point. However, this conventional method is intrusive; the user has to be prompted to do something (look at the displayed point) to fully enroll the eye(s).

Figure 2:
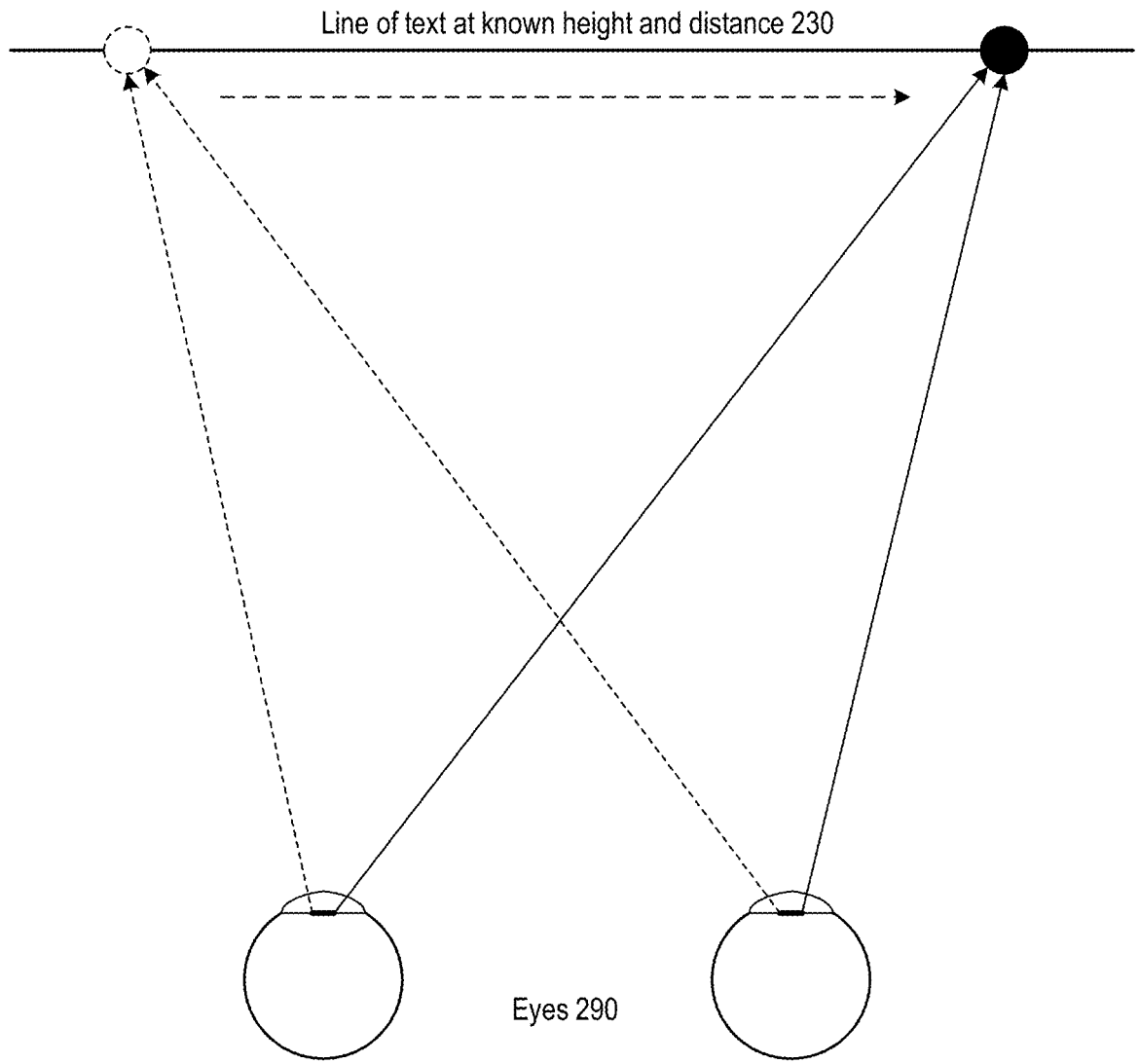
FIG. 2 broadly illustrates an unobtrusive visual axis enrollment process, according to some embodiments.

Embodiments of methods and apparatus to inconspicuously and unobtrusively estimate and enroll the visual axis 122 for the eye(s) are described. In embodiments, as illustrated in FIG. 2, rather than displaying a point and prompting the user to look at the point, a relatively long line 230 of text (or other content) is displayed as a stimulus at a known vertical location and virtual depth that the user can then read. This line of text 230 may include content that the user needs to read as part of the enrollment process, such as "Please read and agree to the following terms of use." The line of text 230 may be the only content (or the only content at that close of a distance) displayed at the time, and the alphanumeric characters in the line may be of a relatively small vertical size. As the user reads the line of text 230, the eye tracking cameras may capture images of the eye(s) 290. This image data may then be processed to estimate a stimulus plane. The error between the estimated stimulus plane and the ground truth stimulus plane (the actual location of the line of text in virtual space) may then be used to estimate the kappa angle and thus the visual axis of the eye(s) 290.

By assuming the eye vergence is good, the gaze data with the strongest vergence can be located using eye pose only. The displayed text 230 (the stimulus) is a thin line, which allows the pitch component of the kappa angle to be determined. Using the known depth of the virtual line of text 230, left/right yaw angles can be estimated under the constraint that the vergence point is always at the same depth for different gaze angles.

The personalized eye model and the estimated kappa angle/visual axis may then be used in various algorithms, for example in the gaze estimation process for a gaze-based interface, during use of the device.

This method of estimating the visual axis using an unobtrusive stimulus (e.g., a line of text to be read) avoids an extra step in the eye enrollment process, and is thus more efficient and less intrusive than previous methods. The user reads the line of text, and the eye model and visual axis are enrolled. No explicit eye enrollment process with prompts to the user is necessary.

Figure 3:
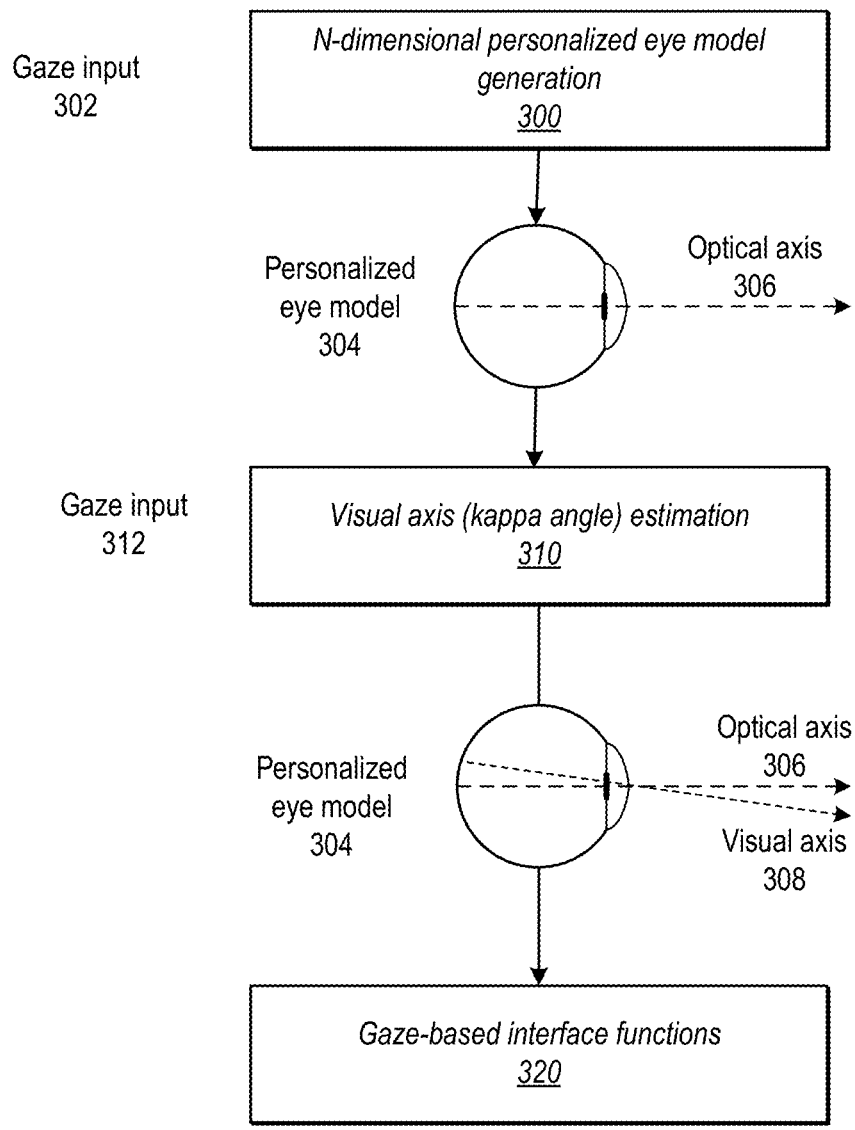
FIG. 3 graphically illustrates an eye enrollment process, according to some embodiments.

FIG. 3 graphically illustrates an eye enrollment process, according to some embodiments. At 300, an N-dimensional personalized eye model 304 may be generated from two or more images of the eye(s) captured by the eye tracking camera of the eye(s) (gaze input 302). This can be done in the background during a user enrollment process after the user puts on and/or turns on the device, and can be done without specifically prompting the user to do anything specific for eye enrollment. The personalized eye model 304 may include information such as a cornea surface model, iris and pupil model, eye center, entrance pupil, and pupillary or optical axis 308 (a vector which passes through the eye center and the entrance pupil).

However, an eye's actual gaze direction corresponds to a visual axis, which is offset from the calculated optical axis 306 of the eye model 304. Thus, at 310, a visual axis 308, or kappa angle between the optical axis 306 and the visual axis 308, is estimated. In this process, a relatively long line of text (or other content) is displayed as a stimulus at a known vertical location and virtual depth that the user can then read. As the user reads the line of text, the eye tracking cameras capture images of the eye(s) (gaze input 312). This gaze input 312 may then be processed to estimate a stimulus plane. The error between the estimated stimulus plane and the ground truth stimulus plane (the actual location of the line of text in virtual space) may then be used to estimate the kappa angle and thus the visual axis of the eye(s).

By assuming the eye vergence is good, the gaze data with the strongest vergence can be located using eye pose only. The displayed text (the stimulus) is a thin line, which allows the pitch component of the kappa angle to be determined. Using the known depth of the virtual line of text, left/right yaw angles can be estimated under the constraint that the vergence point is always at the same depth for different gaze angles.

The personalized eye model 304 and the visual axis 308 may then be used in various algorithms, for example in gaze-based interaction functions of the device. The eye tracking cameras capture images of the user's eyes during these functions, and gaze tracking algorithms of the device process these images using the eye model 304 and visual axis 308 to determine gaze direction of the eyes, with gaze direction corrected from the optical axis 306 to the visual axis 308 according to the kappa angle.

Figure 4:
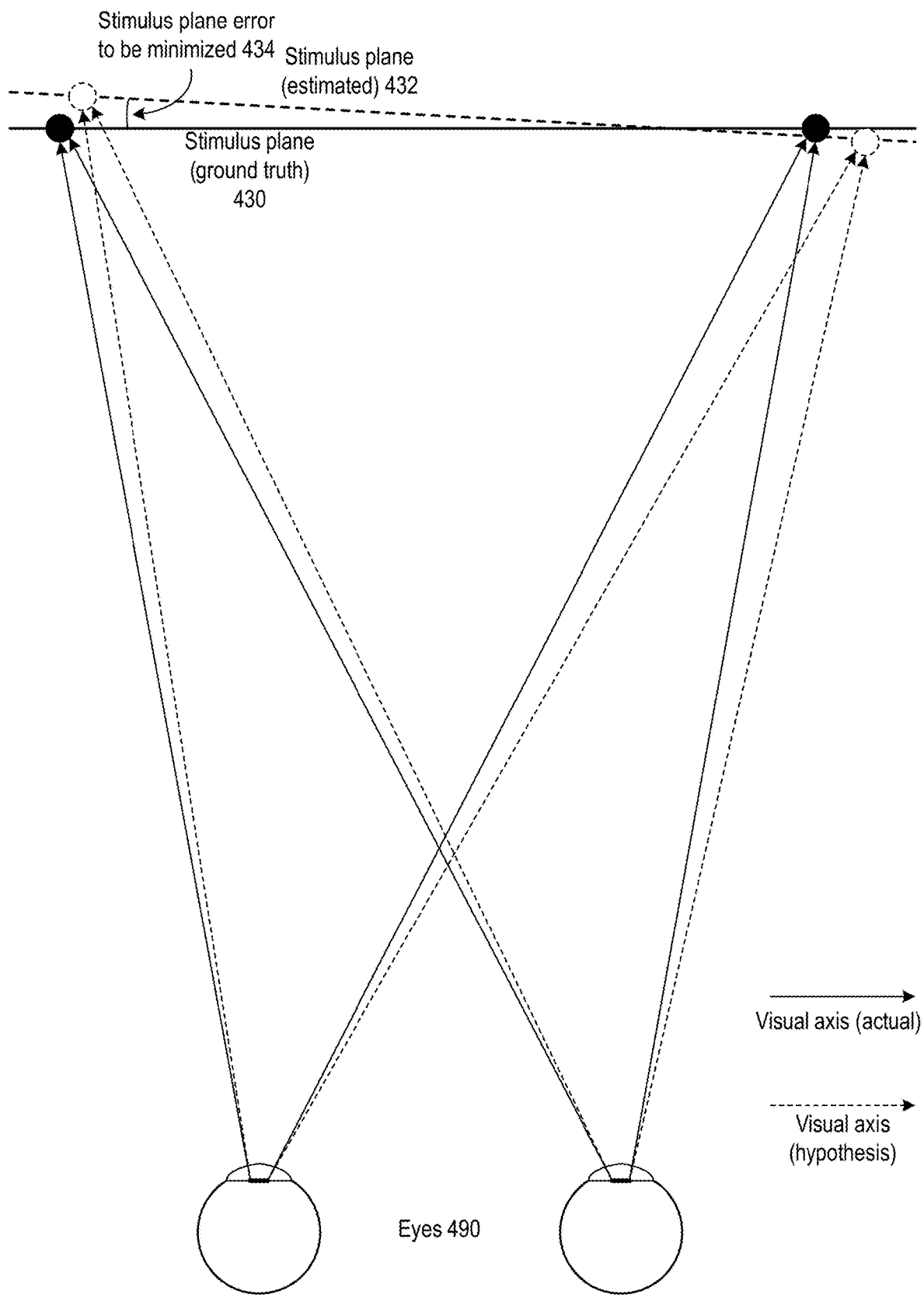
FIG. 4 illustrates an unobtrusive visual axis enrollment process in more detail, according to some embodiments.

FIG. 4 illustrates an unobtrusive visual axis enrollment process in more detail, according to some embodiments. The process may begin with an initial default kappa angle (e.g., 0). Stimulus plane (ground truth) 430 corresponds to the line of text (or other content) displayed at a known vertical location and virtual depth, and the circles represent the vergence point. As the user reads the line of text, a stimulus plane 432 is estimated from gaze tracking data (using the eye model and default kappa angle). The error 434 between the estimated stimulus plane 432 and the ground truth stimulus plane 430 can then be estimated. This error 434 can be used to estimate the true kappa angle.

Figure 5A:
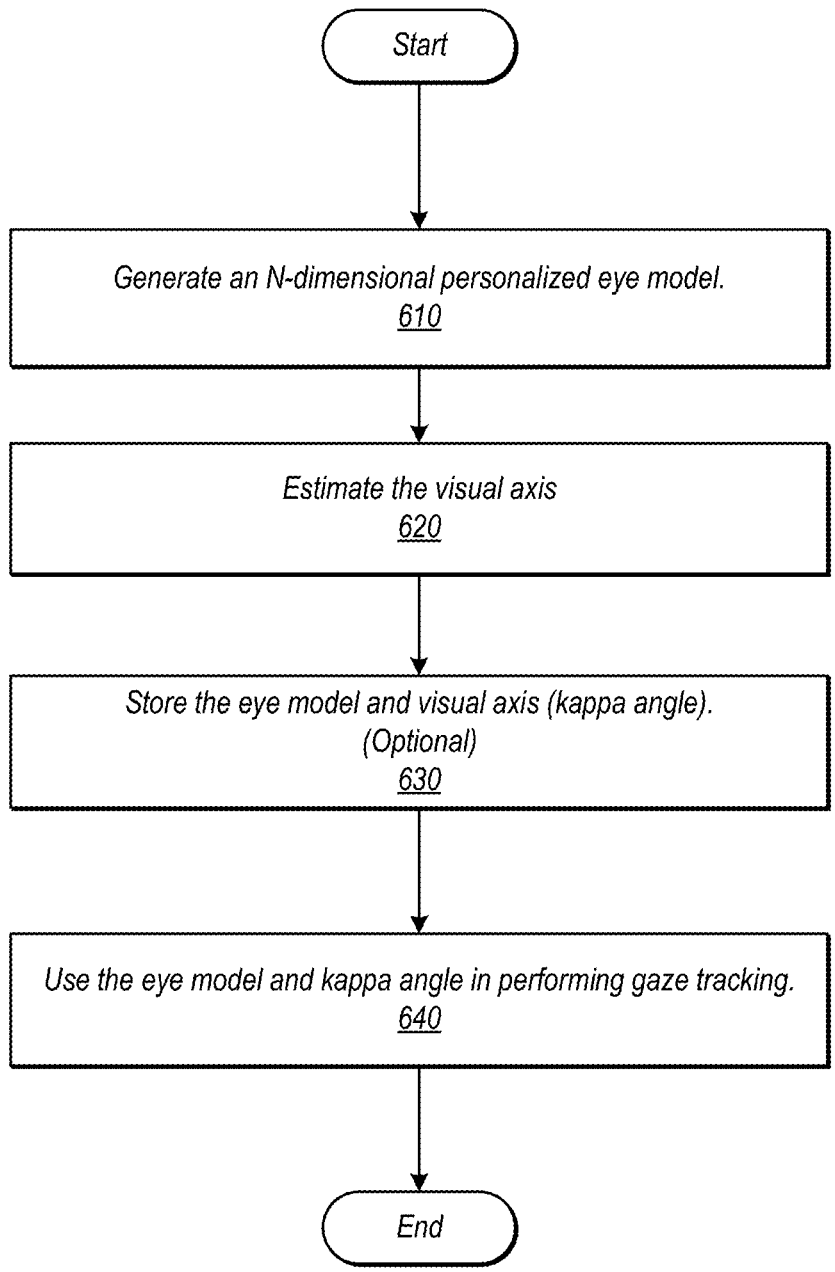
FIG. 5A is a high-level flowchart of an eye enrollment process, according to some embodiments.
Figure 5B:
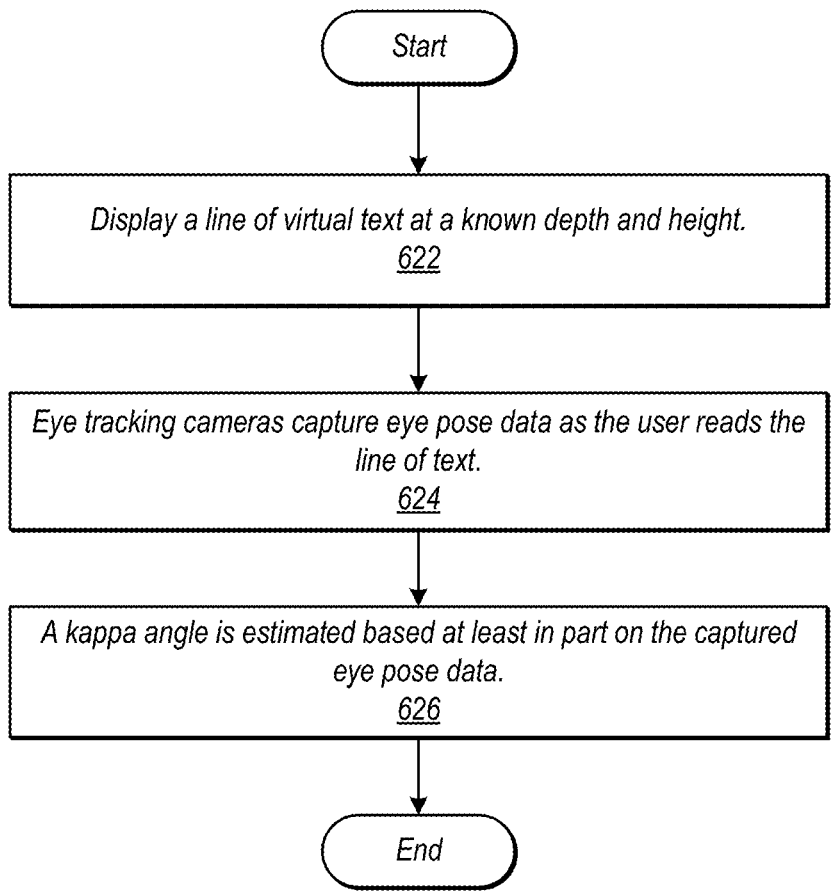
FIG. 5B is a high-level flowchart of an unobtrusive visual axis enrollment process, according to some embodiments.

FIG. 5A is a high-level flowchart of an eye enrollment process, according to some embodiments. As indicated at 610, an N-dimensional personalized eye model is generated. As indicated at 620, a visual axis is estimated. FIG. 5B provides more detail of the visual axis estimation process. As indicated at 630, optionally, the eye model and visual axis (kappa angle) may be stored. As indicated at 640, the eye model and kappa angle may be used in performing gaze tracking during use of the device.

FIG. 5B is a high-level flowchart of an unobtrusive visual axis enrollment process, according to some embodiments. The process may begin with an initial default kappa angle (e.g., 0). As indicated at 622, a line of virtual text may be displayed at a known virtual depth and height as a stimulus. The line of text may be the only content displayed (or displayed at the known virtual depth) at the time. In other words, in some embodiments, only a single horizontal line of content such as text needs to be displayed. As indicated at 624, as the user reads the line of text, eye tracking cameras capture images of the eyes; eye pose data is generated from the captured image data. A stimulus plane is estimated from the gaze tracking data (using the eye model and default kappa angle). As indicated at 626, a kappa angle is estimated based at least in part on the data generated from the pose of the eye as the user reads the text. The error 434 between the estimated stimulus plane and the ground truth stimulus plane (the line of text can then be estimated; this error can then be used to estimate the true kappa angle. The kappa angle indicates the true visual axis of the eye.

While embodiments are generally described and illustrated with reference to one eye, there may be eye tracking cameras for both eyes, and eye enrollment and gaze tracking may be performed for both eyes, and thus the technology described herein may be implemented for both the left and right eyes in an HMD.

Figure 6A:
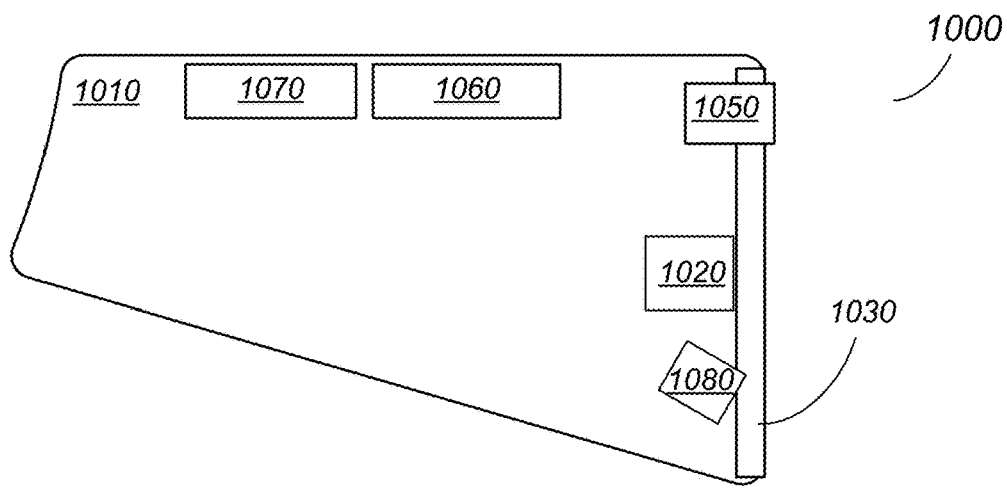
FIGS. 6A through 6C illustrate example devices in which the methods of FIGS. 1 through 5B may be implemented, according to some embodiments.
Figure 6B:
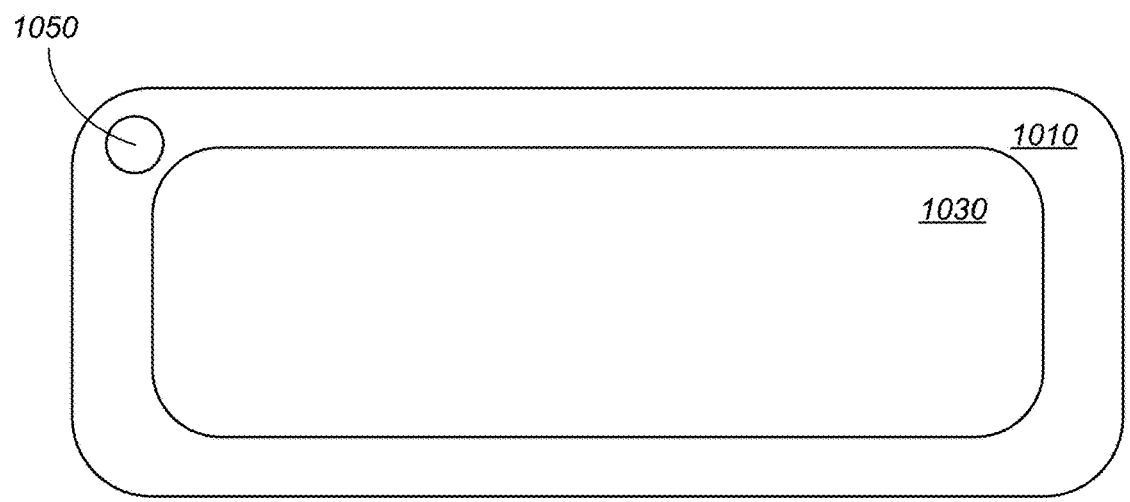
Figure 6C:
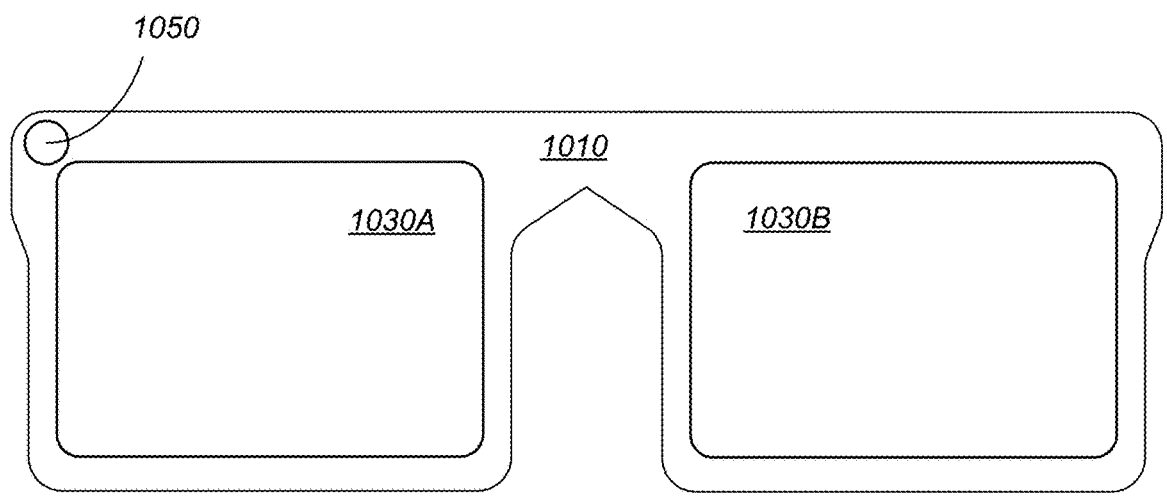

FIGS. 6A through 6C illustrate example devices in which the methods of FIGS. 1 through 5B may be implemented, according to some embodiments. Note that the HMDs 1000 as illustrated in FIGS. 6A through 6C are given by way of example, and are not intended to be limiting. In various embodiments, the shape, size, and other features of an HMD 1000 may differ, and the locations, numbers, types, and other features of the components of an HMD 1000 and of the eye imaging system. FIG. 6A shows a side view of an example HMD 1000, and FIGS. 6B and 6C show alternative front views of example HMDs 1000, with FIG. 6A showing device that has one lens 1030 that covers both eyes and FIG. 6B showing a device that has right 1030A and left 1030B lenses.

HMD 1000 may include lens(es) 1030, mounted in a wearable housing or frame 1010. HMD 1000 may be worn on a user's head (the "wearer") so that the lens(es) is disposed in front of the wearer's eyes. In some embodiments, an HMD 1000 may implement any of various types of display technologies or display systems. For example, HMD 1000 may include a display system that directs light that forms images (virtual content) through one or more layers of waveguides in the lens(es) 1030; output couplers of the waveguides (e.g., relief gratings or volume holography) may output the light towards the wearer to form images at or near the wearer's eyes. As another example, HMD 1000 may include a direct retinal projector system that directs light towards reflective components of the lens(es); the reflective lens(es) is configured to redirect the light to form images at the wearer's eyes.

In some embodiments, HMD 1000 may also include one or more sensors that collect information about the wearer's environment (video, depth information, lighting information, etc.) and about the wearer (e.g., eye or gaze tracking sensors). The sensors may include one or more of, but are not limited to one or more eye tracking cameras 1020 (e.g., infrared (IR) cameras) that capture views of the user's eyes, one or more world-facing or PoV cameras 1050 (e.g., RGB video cameras) that can capture images or video of the real-world environment in a field of view in front of the user, and one or more ambient light sensors that capture lighting information for the environment. Cameras 1020 and 1050 may be integrated in or attached to the frame 1010. HMD 1000 may also include one or more light sources 1080 such as LED or infrared point light sources that emit light (e.g., light in the IR portion of the spectrum) towards the user's eye or eyes.

A controller 1060 for the XR system may be implemented in the HMD 1000, or alternatively may be implemented at least in part by an external device (e.g., a computing system or handheld device) that is communicatively coupled to HMD 1000 via a wired or wireless interface. Controller 1060 may include one or more of various types of processors, image signal processors (ISPs), graphics processing units (GPUs), coder/decoders (codecs), system on a chip (SOC), CPUs, and/or other components for processing and rendering video and/or images. In some embodiments, controller 1060 may render frames (each frame including a left and right image) that include virtual content based at least in part on inputs obtained from the sensors and from an eye tracking system, and may provide the frames to the display system.

Memory 1070 for the XR system may be implemented in the HMD 1000, or alternatively may be implemented at least in part by an external device (e.g., a computing system) that is communicatively coupled to HMD 1000 via a wired or wireless interface. The memory 1070 may, for example, be used to record video or images captured by the one or more cameras 1050 integrated in or attached to frame 1010. Memory 1070 may include any type of memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used in an HMD to store processed data, such as Flash or other "hard drive" technologies. This other storage may be separate from the externally coupled storage mentioned below.

While FIGS. 6A through 6C only show light sources 1080 and cameras 1020 and 1050 for one eye, embodiments may include light sources 1080 and cameras 1020 and 1050 for each eye, and gaze tracking may be performed for both eyes. In addition, the light sources, 1080, eye tracking camera 1020 and PoV camera 1050 may be located elsewhere than shown.

Embodiments of an HMD 1000 as illustrated in FIGS. 6A-6C may, for example, be used in augmented or mixed (AR) applications to provide augmented or mixed reality views to the wearer. HMD 1000 may include one or more sensors, for example located on external surfaces of the HMD 1000, that collect information about the wearer's external environment (video, depth information, lighting information, etc.); the sensors may provide the collected information to controller 1060 of the XR system. The sensors may include one or more visible light cameras 1050 (e.g., RGB video cameras) that capture video of the wearer's environment that, in some embodiments, may be used to provide the wearer with a virtual view of their real environment. In some embodiments, video streams of the real environment captured by the visible light cameras 1050 may be processed by the controller 1060 of the HMD 1000 to render augmented or mixed reality frames that include virtual content overlaid on the view of the real environment, and the rendered frames may be provided to the display system. In some embodiments, input from the eye tracking camera 1020 may be used in a PCCR gaze tracking process executed by the controller 1060 to track the gaze/pose of the user's eyes for use in rendering the augmented or mixed reality content for display. In addition, one or more of the methods as illustrated in FIGS. 1 through 5B may be implemented in the HMD to provide unobtrusive visual axis enrollment for the HMD 1000.

Figure 7:
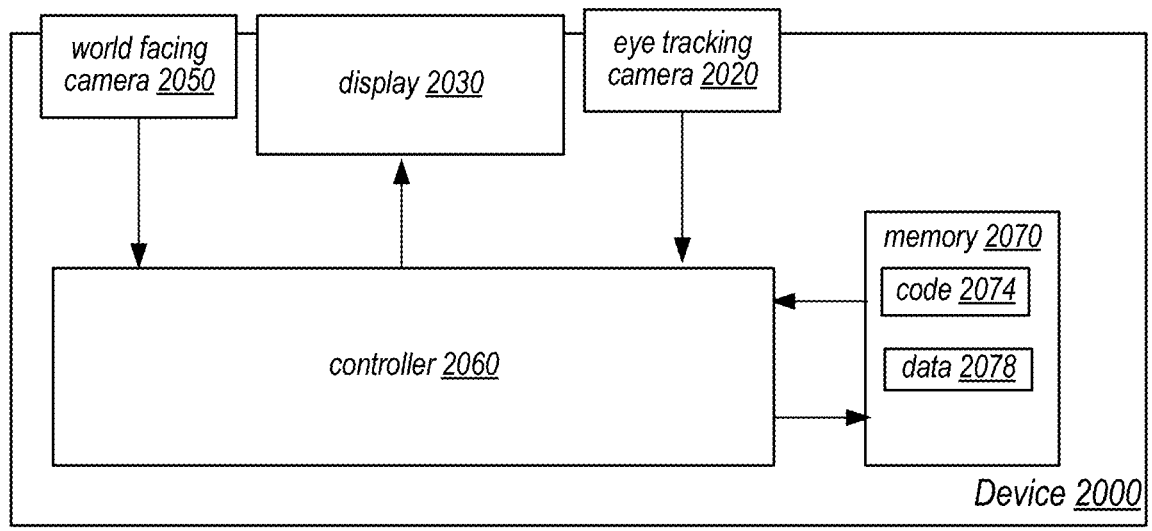
FIG. 7 is a block diagram illustrating an example device that may include components and implement methods as illustrated in FIGS. 1 through 5B, according to some embodiments.

FIG. 7 is a block diagram illustrating an example device that may include components and implement methods as illustrated in FIGS. 1 through 5B, according to some embodiments.

In some embodiments, an XR system may include a device 2000 such as a headset, helmet, goggles, or glasses. Device 2000 may implement any of various types of display technologies. For example, device 2000 may include a transparent or translucent display 2060 (e.g., eyeglass lenses) through which the user may view the real environment and a medium integrated with display 2060 through which light representative of virtual images is directed to the wearer's eyes to provide an augmented view of reality to the wearer.

In some embodiments, device 2000 may include a controller 2060 configured to implement functionality of the XR system and to generate frames (each frame including a left and right image) that are provided to display 2030. In some embodiments, device 2000 may also include memory 2070 configured to store software (code 2074) of the XR system that is executable by the controller 2060, as well as data 2078 that may be used by the XR system when executing on the controller 2060. In some embodiments, memory 2070 may also be used to store video captured by camera 2050. In some embodiments, device 2000 may also include one or more interfaces (e.g., a Bluetooth technology interface, USB interface, etc.) configured to communicate with an external device (not shown) via a wired or wireless connection. In some embodiments, at least a part of the functionality described for the controller 2060 may be implemented by the external device. The external device may be or may include any type of computing system or computing device, such as a desktop computer, notebook or laptop computer, pad or tablet device, smartphone, hand-held computing device, game controller, game system, and so on.

In various embodiments, controller 2060 may be a uniprocessor system including one processor, or a multiprocessor system including several processors (e.g., two, four, eight, or another suitable number). Controller 2060 may include central processing units (CPUs) configured to implement any suitable instruction set architecture, and may be configured to execute instructions defined in that instruction set architecture. For example, in various embodiments controller 2060 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2060 may employ any microarchitecture, including scalar, superscalar, pipelined, superpipelined, out of order, in order, speculative, non-speculative, etc., or combinations thereof. Controller 2060 may include circuitry to implement microcoding techniques. Controller 2060 may include one or more processing cores each configured to execute instructions. Controller 2060 may include one or more levels of caches, which may employ any size and any configuration (set associative, direct mapped, etc.). In some embodiments, controller 2060 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2060 may include one or more other components for processing and rendering video and/or images, for example image signal processors (ISPs), coder/decoders (codecs), etc.

Memory 2070 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration. In some embodiments DRAM may be used as temporary storage of images or video for processing, but other storage options may be used to store processed data, such as Flash or other "hard drive" technologies.

In some embodiments, device 2000 may include one or more sensors that collect information about the user's environment (video, depth information, lighting information, etc.). The sensors may provide the information to the controller 2060 of the XR system. In some embodiments, the sensors may include, but are not limited to, at least one visible light camera (e.g., an RGB video camera) 2050, ambient light sensors, and at least on eye tracking camera 2020. In some embodiments, device 2000 may also include one or more IR light sources; light from the light sources reflected off the eye may be captured by the eye tracking camera 2020. Gaze tracking algorithms implemented by controller 2060 may process images or video of the eye captured by the camera 2020 to determine eye pose and gaze direction. In addition, one or more of the methods as illustrated in FIGS. 1 through 5 may be implemented in device 2000 to provide unobtrusive visual axis enrollment for the device 2000.

In some embodiments, device 2000 may be configured to render and display frames to provide an augmented or mixed reality (MR) view for the user based at least in part according to sensor inputs, including input from the eye tracking camera 2020. The MR view may include renderings of the user's environment, including renderings of real objects in the user's environment, based on video captured by one or more video cameras that capture high-quality, high-resolution video of the user's environment for display. The MR view may also include virtual content (e.g., virtual objects, virtual tags for real objects, avatars of the user, etc.) generated by the XR system and composited with the displayed view of the user's real environment.

Extended Reality

A real environment refers to an environment that a person can perceive (e.g., see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
    a display subsystem configured to display virtual content to an eye;
    an eye-facing camera configured to capture images of the eye; and
    a controller comprising one or more processors configured to:
        cause a horizontal line of content to be displayed by the display subsystem at a known vertical location and virtual depth; and
        process images of the eye captured by the eye-facing camera as the eye scans the line of content to estimate a kappa angle for the eye, wherein the kappa angle indicates a visual axis of the eye.

2. The device as recited in claim 1, wherein, prior to causing the line of content to be displayed, the controller is configured to generate a multidimensional personalized eye model based on images of the eye captured by the eye-facing camera, wherein the eye model includes an optical axis of the eye, and wherein the kappa angle is an offset from the optical axis to the visual axis of the eye.

3. The device as recited in claim 2, wherein, to process images of the eye captured by the eye-facing camera as the eye scans the line of content to estimate a kappa angle for the eye, the controller is configured to:
    set an initial kappa angle with respect to the optical axis of the eye model;
    estimate a stimulus plane from eye pose data generated from the captured images using the eye model and initial kappa angle;
    determine an error between the estimated stimulus plane and a ground truth stimulus plane corresponding to the displayed line of content; and
    estimate the kappa angle for the eye based on the determined error between the estimated stimulus plane and the ground truth stimulus plane.

4. The device as recited in claim 1, wherein the line of content is a line of text to be read during an enrollment process for the device.

5. The device as recited in claim 1, wherein the line of content is the only content displayed at the known virtual depth.

6. The device as recited in claim 1, wherein said causing a horizontal line of content to be displayed and said processing images of the eye captured by the eye-facing camera are performed during an enrollment process for the device.

7. The device as recited in claim 1, wherein the device further includes a second eye-facing camera configured to capture images of a second eye, and wherein the controller is further configured to process images of the second eye captured by the second eye-facing camera as the second eye also scans the line of content to estimate a kappa angle for the second eye, wherein the kappa angle indicates a visual axis for the second eye.

8. The device as recited in claim 1, wherein the device is a head-mounted device (HMD) of an extended reality (XR) system.

9. A method, comprising:
    performing, by a controller comprising one or more processors:
        causing a horizontal line of content to be displayed by a display subsystem at a known vertical location and virtual depth; and
        estimating a kappa angle for an eye based at least in part on images of the eye captured by an eye-facing camera as the eye scans the line of content, wherein the kappa angle indicates a visual axis for the eye.

10. The method as recited in claim 9, further comprising, prior to causing the horizontal line of content to be displayed, generating a multidimensional personalized model of the eye based on images of the eye captured by the eye-facing camera, wherein the eye model includes an optical axis for the eye, and wherein the kappa angle is an offset from the optical axis to the visual axis of the eye.

11. The method as recited in claim 10, wherein estimating a kappa angle for the eye based at least in part on images of the eye captured by an eye-facing camera as the eye scans the line of content comprises:
    setting an initial kappa angle with respect to the optical axis of the eye model;
    estimating a stimulus plane from eye pose data generated from the captured images using the eye model and initial kappa angle;
    determining an error between the estimated stimulus plane and a ground truth stimulus plane corresponding to the displayed line of content; and
    estimating the kappa angle for the eye based on the determined error between the estimated stimulus plane and the ground truth stimulus plane.

12. The method as recited in claim 9, wherein the line of content is a line of text to be read during an enrollment process for a device.

13. The method as recited in claim 9, wherein the line of content is the only content displayed at the known virtual depth.

14. The method as recited in claim 9, wherein said causing a horizontal line of content to be displayed and said estimating a kappa angle for the eye are performed during an enrollment process for a device.

15. The method as recited in claim 9, wherein the method further comprises estimating a kappa angle for a second eye.

16. The method as recited in claim 9, wherein the controller, display system, and eye-facing camera are components of a head-mounted device (HMD) of an extended reality (XR) system.

17. A system, comprising:
 a head-mounted device (HMD), comprising
  a display subsystem configured to display virtual content to an eye;
  an eye-facing camera configured to capture images of the eye; and
  a controller comprising one or more processors configured to:
   generate a multidimensional personalized eye model based on images of the eye captured by the eye-facing camera, wherein the eye model includes an optical axis of the eye;
   cause a horizontal line of content to be displayed by the display subsystem at a known vertical location and virtual depth; and
   estimate a kappa angle for the eye based at least in part on images of the eye captured by an eye-facing camera as the eye scans the line of content, wherein the kappa angle is an offset from the optical axis to a visual axis of the eye.

18. The system as recited in claim 17, wherein, to estimate a kappa angle for the eye, the controller is configured to:
 set an initial kappa angle with respect to the optical axis of the eye model;
 estimate a stimulus plane from eye pose data generated from the captured images using the eye model and initial kappa angle;
 determine an error between the estimated stimulus plane and a ground truth stimulus plane corresponding to the displayed line of content; and
 estimate the kappa angle for the eye based on the determined error between the estimated stimulus plane and the ground truth stimulus plane.

19. The system as recited in claim 17, wherein said causing a horizontal line of content to be displayed and said estimating a kappa angle for the eye are performed during an enrollment process for the head-mounted device.

20. The system as recited in claim 17, wherein the line of content is a line of text to be read during an enrollment process for the head-mounted device, and wherein the line of text is the only content displayed at the known virtual depth.

21. The system as recited in claim 17, wherein the system is an extended reality (XR) system.

* * * * *